US012759894B2

(12) United States Patent
Fukushi

(10) Patent No.: US 12,759,894 B2
(45) Date of Patent: Oct. 13, 2026

(54) TUNGSTEN OXIDE POWDER SLURRY, METHOD OF PRODUCING THE SAME, AND METHOD OF PRODUCING AN ELECTROCHROMIC DEVICE USING THE SAME

(71) Applicant: Niterra Materials Co., Ltd., Yokohama (JP)

(72) Inventor: Daisuke Fukushi, Yokohama (JP)

(73) Assignee: Niterra Materials Co., Ltd., Yokohama (JP)

( * ) Notice: Subject to any disclaimer, the term of this patent is extended or adjusted under 35 U.S.C. 154(b) by 571 days.

(21) Appl. No.: 18/322,730

(22) Filed: May 24, 2023

(65) Prior Publication Data

US 2023/0295004 A1 Sep. 21, 2023

Related U.S. Application Data

(63) Continuation of application No. PCT/JP2022/005366, filed on Feb. 10, 2022.

(30) Foreign Application Priority Data

Feb. 24, 2021 (JP) ................................ 2021-027275

(51) Int. Cl.
*C01G 41/00* (2006.01)
*C01G 41/02* (2006.01)

(52) U.S. Cl.
CPC .......... *C01G 41/02* (2013.01); *C01P 2002/74* (2013.01); *C01P 2004/51* (2013.01);
(Continued)

(58) Field of Classification Search
CPC ................ C01G 41/02; C01P 2002/74; C01P 2004/51; C01P 2004/61; C01P 2004/64;
(Continued)

(56) References Cited

U.S. PATENT DOCUMENTS 6,005,705 A 12/1999 Schmidt et al.
9,409,144 B2 * 8/2016 Sato .................. B01J 20/28057
(Continued)

FOREIGN PATENT DOCUMENTS

CN 101641292 A 2/2010
CN 108779000 A 11/2018
(Continued)

OTHER PUBLICATIONS

Gratian R. Bamwenda et al. "The visible light induced photocatalytic activity of tungsten trioxide powders", Applied Catalysis A: General 210 (2001) 181-191.*
(Continued)

*Primary Examiner* — Cam N. Nguyen
(74) *Attorney, Agent, or Firm* — Muncy, Geissler, Olds & Lowe, P.C.

(57) ABSTRACT

According to one embodiment, provided is a tungsten oxide powder slurry in which a tungsten oxide powder and an aqueous solvent are mixed. $D_{50}$ is 20 nm to 10000 nm and $D_{90}$ is 100000 nm or less in a particle size cumulative graph of the tungsten oxide powder in the slurry. According to X-ray diffraction, a half-value width of a most intense peak detected at 29°±1° is 2° or less.

16 Claims, 2 Drawing Sheets

(52) U.S. Cl.
CPC ...... *C01P 2004/61* (2013.01); *C01P 2004/64* (2013.01); *C01P 2006/40* (2013.01)

(58) Field of Classification Search
CPC .............. C01P 2006/40; C01P 2002/54; C01P 2002/72; C01P 2004/52; C01P 2004/62; C01P 41/00; B01J 23/30
USPC .................................. 423/606; 502/305, 306
See application file for complete search history.

(56) References Cited

U.S. PATENT DOCUMENTS

| | | | | |
|---|---|---|---|---|
| 10,081,850 | B2 * | 9/2018 | Sato | B01J 20/06 |
| 11,884,882 | B2 * | 1/2024 | Fukushi | C09K 9/00 |
| 12,037,260 | B2 * | 7/2024 | Shigesato | C01G 55/004 |
| 12,372,843 | B2 * | 7/2025 | Fukushi | C09K 9/00 |
| 12,384,959 | B2 * | 8/2025 | Fukushi | C01G 41/006 |
| 2010/0113254 | A1 | 5/2010 | Sato et al. | |
| 2010/0292075 | A1 | 11/2010 | Nakano et al. | |
| 2011/0212298 | A1 | 9/2011 | Nakano et al. | |
| 2011/0212832 | A1 | 9/2011 | Nakano et al. | |
| 2012/0201861 | A1 * | 8/2012 | Nakano | B01J 37/04 977/773 |
| 2018/0290127 | A1 | 10/2018 | Fukushi et al. | |
| 2018/0370813 | A1 | 12/2018 | Tsunematsu et al. | |
| 2019/0002708 | A1 | 1/2019 | Tsunematsu et al. | |
| 2020/0048107 | A1 | 2/2020 | Shigesato et al. | |
| 2020/0308018 | A1 | 10/2020 | Aihara et al. | |
| 2021/0214273 | A1 | 7/2021 | Tsunematsu et al. | |
| 2022/0002166 | A1 | 1/2022 | Fukushi et al. | |

FOREIGN PATENT DOCUMENTS

| | | | |
|---|---|---|---|
| CN | 111372894 | A | 7/2020 |
| JP | H09-512112 | A | 12/1997 |
| JP | 2006-328578 | A | 12/2006 |
| JP | 2009-202152 | A | 9/2009 |
| JP | 2009-215487 | A | 9/2009 |
| JP | 2009-291717 | A | 12/2009 |
| JP | 2010-269266 | A | 12/2010 |
| JP | 2010-280551 | A | 12/2010 |
| JP | 2011-257474 | A | 12/2011 |
| JP | 2013-063442 | A | 4/2013 |
| JP | 2014-184436 | A | 10/2014 |
| JP | 5597532 | B2 | 10/2014 |
| JP | 5641926 | B2 | 12/2014 |
| JP | 2018-027872 | A | 2/2018 |
| WO | 2009/110234 | A1 | 9/2009 |
| WO | 2017/104853 | A1 | 6/2017 |
| WO | 2018/199020 | A1 | 11/2018 |
| WO | 2019/216152 | A1 | 11/2019 |
| WO | 2020/196720 | A1 | 10/2020 |

OTHER PUBLICATIONS

Extended European Search Report (Application No. 22759395.1) dated Sep. 30, 2025.
Chinese Office Action (Application No. 202280008734.7) dated May 22, 2025 (with English translation) (15 pages).
International Search Report and Written Opinion dated Mar. 22, 2022 (Application No. PCT/JP2022/005366).
Japanese Office Action (with English translation) dated Jan. 21, 2025 (Application No. 2023-502279).

* cited by examiner

TUNGSTEN OXIDE POWDER SLURRY, METHOD OF PRODUCING THE SAME, AND METHOD OF PRODUCING AN ELECTROCHROMIC DEVICE USING THE SAME

CROSS-REFERENCE TO RELATED APPLICATIONS

This application is a Continuation Application of PCT Application No. PCT/JP2022/005366, filed Feb. 10, 2022 and based upon and claiming the benefit of priority from prior Japanese Patent Application No. 2021-027275, filed Feb. 24, 2021, the entire contents of all of which are incorporated herein by reference.

FIELD

Embodiments described hereafter relate to a tungsten oxide powder slurry, a method of producing the same, and a method of producing an electrochromic device using the same.

BACKGROUND

Tungsten oxide powder is used in various fields such as electrochromic materials, battery electrode materials, photocatalysts, and sensors. For example, PCT publication WO 2018/199020 A1 discloses a tungsten oxide powder having an average particle size of 50 nm or less. In WO 2018/199020 A1, those having predetermined values according to the spectroscopic ellipsometry method are used. Improvement of photocatalytic performance has been demonstrated for those in WO 2018/199020 A1. Improvement in response time of the electrochromic device has also been demonstrated.

For example, the electrochromic device can switch between transparent and colored states by switching electric charges on and off. When an electrochromic device was formed using the tungsten oxide powder of WO 2018/199020 A1, there had been a problem in that the transparency decreased. When the cause thereof was investigated, and it had been found that there was a problem in aggregation property of the tungsten oxide powder.

A coating process is used for forming an electrode layer of the electrochromic device. The coating process uses a paste containing a tungsten oxide powder. A paste is obtained by mixing an organic binder into an aqueous solvent. The paste is prepared using a slurry obtained by mixing a tungsten oxide powder and an aqueous dispersion liquid. The slurry is mixed with an organic substance such as a binder to form a paste.

For example, Japanese Patent No. 5641926 discloses a slurry in which particle diameters $D_{50}$ and $D_{90}$ of the tungsten oxide powder are controlled. In Japanese Patent No. 5641926, the slurry is a mixture of tungsten oxide powder and an aqueous solvent. Even when the slurry of Japanese Patent No. 5641926 was used, there was a problem in aggregation property.

DETAILED DESCRIPTION

According to one embodiment, provided is a tungsten oxide powder slurry in which a tungsten oxide powder and an aqueous solvent are mixed. $D_{50}$ is 20 nm to 10000 nm and $D_{90}$ is 100000 nm or less in a particle size cumulative graph of the tungsten oxide powder in the slurry. According to X-ray diffraction, a half-value width of a most intense peak detected at 29°±1° is 2° or less.

In the slurry of Japanese Patent No. 5641926, the particle size distribution of the tungsten oxide powder is controlled. When the slurry obtained by mixing the tungsten oxide powder and the aqueous solvent was allowed to stand for a long time, aggregation of the tungsten oxide powder had occurred. Consequently, there has been a phenomenon where the particle size distribution upon adding the tungsten oxide powder to the aqueous solvent could not be maintained.

The present invention has been made to confront such problems and provides a tungsten oxide powder slurry capable of suppressing aggregation even when left to stand for a long time.

The tungsten oxide powder slurry according to the embodiment is a tungsten oxide powder slurry where a tungsten oxide powder and an aqueous solvent are mixed, and has a feature where $D_{50}$ is 20 nm to 10000 nm and $D_{90}$ is 100000 nm or less in a particle size cumulative graph of the tungsten oxide powder in the slurry, and where a half-value width of a most intense peak detected at 29°±1° in X-ray diffraction analysis (2θ) is 2° or less.

The tungsten oxide powder preferably satisfies $WO_{3-x}$, for which $0 \le x < 0.3$. The tungsten oxide powder has a property of exhibiting intercalation. Intercalation is a reversible reaction in which electrons or ions move into or out of a nanometal compound particle. Actively performing the intercalation reaction improves performance as a semiconductor. In addition, movement of electrons due to application of electricity or irradiating light becomes active. Therefore, the tungsten oxide powder serves as a material suitable for various fields such as a photocatalyst, electrochromic device, battery electrode material, and sensor.

When used for an electrochromic device material or a photocatalytic material, the tungsten oxide powder is preferably $WO_3$, i.e., x=0. When used for a battery electrode material or a sensor, the tungsten oxide powder is preferably $WO_{3-x}$ in which $0 < x < 0.3$. $WO_3$ where x=0 indicates having no oxygen defect. When having no oxygen defect, aggregation is less likely.

The aqueous dispersion liquid is a liquid containing water as a main component. The water is preferably pure water. With much impurities as in tap water, the aggregation property may be affected. Pure water satisfies A1 noted in JIS-K-0557 (1998).

Figure 1:
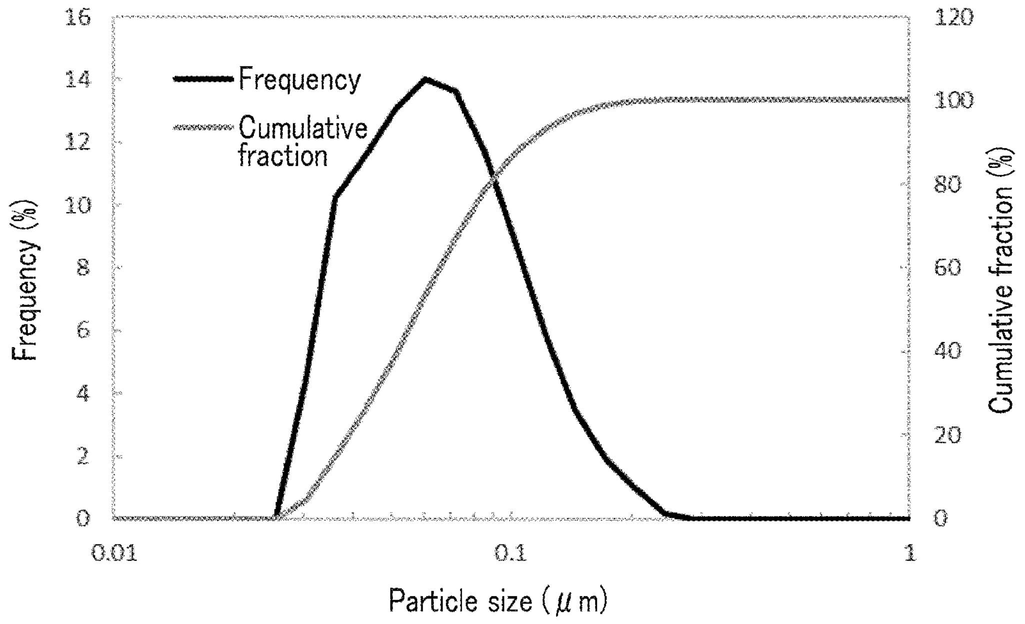
FIG. 1 shows an example of a particle size distribution of a tungsten oxide powder slurry according to an embodiment.

In the particle size cumulative graph of the tungsten oxide powder within the slurry, $D_{50}$ is 20 nm to 10000 nm, and $D_{90}$ is 100000 nm or less. FIG. 1 shows an example of the particle size distribution of the tungsten oxide powder slurry according to the embodiment. In the figure, the horizontal axis represents the particle size (μm), the vertical axis on the left side represents the frequency (%), and the vertical axis on the right side represents the cumulative fraction (%). When the value of the particle size cumulative graph is used, the vertical axis is the cumulative fraction (%). When the value of the particle size frequency graph is used, the vertical axis is the frequency (%). Both the frequency (%) and the accumulation (%) are percentage by count. $D_{50}$ is a particle size at the stage of the percentage of count of 50%. $D_{90}$ is a particle size of the percentage of count of 90%.

The particle size distribution is measured according to a dynamic light scattering method. A sample in which the content of the tungsten oxide powder in the slurry is 0.01% by mass to 0.1% by mass is used. If the content of the tungsten oxide powder in the slurry is more than 0.1% by mass, the slurry is diluted to prepare the sample. If the content of the tungsten oxide powder in the slurry is less than 0.01% by mass, water is removed to prepare the sample. The reason for setting the sample concentration to 0.01% by mass to 0.1% by mass is for grasping the aggregation property at a small amount. This is because if aggregation occurs with a small amount, more aggregation is caused at a higher concentration. Measurement is performed within 1 hour after dilution. The measurement time is 30 seconds. The same sample is measured three times, and the average value thereof is used. The sample for which 1 hour has passed after dilution is stirred sufficiently, and the measurement is performed within 1 hour after the stirring.

As a measurement apparatus for the particle size distribution using the dynamic light scattering method, NANOTRAC UPA-EX manufactured by Microtrac or an apparatus equivalent thereto is used. The measurement time in one measurement is set to 30 seconds, and the average value of three measurements is used as a measurement result. As numerical values to be input into the measurement apparatus, the refractive index of the tungsten oxide powder is 1.81, the particle shape is non-spherical, and the density is 7.3 g/cm$^3$, respectively, and ratios are calculated with volume distribution.

The particle size determined according to the dynamic light scattering method is that for a mixture of primary particles and secondary particles. The primary particle is what would be referred to as a single powder particle. The secondary particle is a state where powder particles are aggregated into one powder particle. The particles that have been aggregated may be referred to as aggregated particles.

For the tungsten oxide powder slurry, in the particle size cumulative graph of the tungsten oxide powder within the slurry, $D_{50}$ is 20 nm to 10000 nm, and $D_{90}$ is 100000 nm or less. The particle size cumulative graph (particle diameter cumulative graph) may be simply referred to as cumulative graph.

$D_{50}$ of the cumulative graph being 20 nm to 10000 nm and $D_{90}$ being 100000 nm or less indicates that there are no large aggregated particles. If $D_{50}$ is less than 20 nm (0.02 μm), the particle diameter is too small, whereby the production load may increase. If $D_{50}$ is larger than 10000 nm (10 μm), aggregated particles are formed when the slurry is left to stand for a long time. Similarly, when the slurry in which $D_{90}$ exceeds 100000 nm (100 μm) is left to stand for a long time, aggregated particles are formed. For example, in the electrochromic device, transparent and colored states are switched. If large aggregated particles are present, improvement of improve light transmittance would be difficult.

Therefore, $D_{50}$ of the cumulative graph is preferably 20 nm to 10000 nm, and more preferably 500 nm or less. $D_{90}$ of the cumulative graph is preferably 100000 nm or less, and more preferably 1000 nm or less.

Furthermore, the slurry has a feature in that the half-value width of the most intense peak detected at 29°±1° is 2° or less, when the tungsten oxide powder within the slurry is subjected to X-ray diffraction analysis (2θ).

Figure 2:
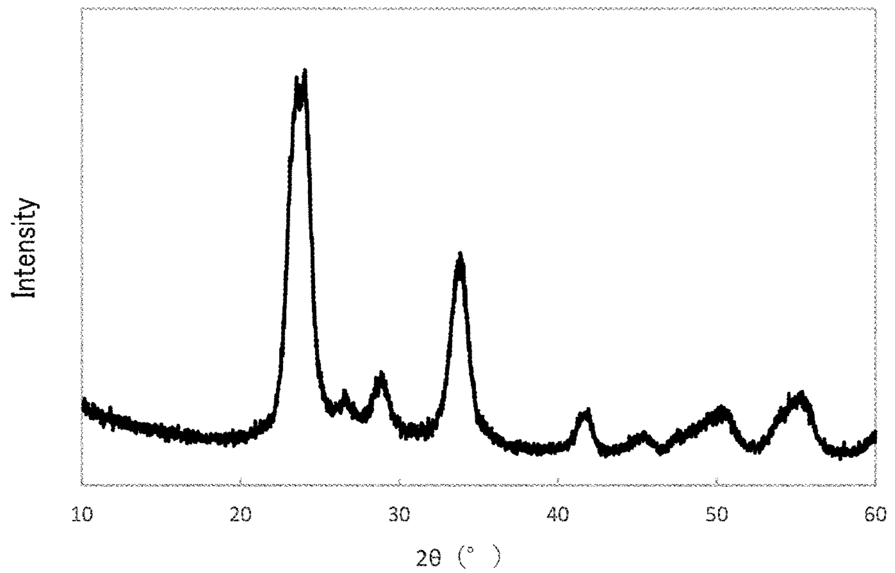
FIG. 2 shows an example of X-ray diffraction (2θ) of the tungsten oxide powder slurry according to the embodiment.

FIG. 2 shows an example of X-ray diffraction (2θ) of the tungsten oxide powder slurry according to the embodiment. In the figure, the vertical axis represents the X-ray diffraction intensity, and the horizontal axis represents the diffraction angle (2θ).

For an X-ray diffraction apparatus, D8 ADVANCE manufactured by Bruker is used, for a detector, a high-speed one dimensional detector YNEYE-XE is used, and for an X-ray tube, KFL-Cu-2KDC or an equivalent thereof is used.

For the X-ray diffraction measurement method, the measurement is performed with Cu target, tube voltage of 40 kV, tube current of 40 mA, operation shaft of 2θ/θ, scanning range (2θ) of 10° to 60°, scanning speed of 0.1°/sec, and step width of 0.02°. For the sample, a sample in which the concentration of the tungsten oxide powder in the slurry is 10% by mass to 40% by mass is used. A recommended sample includes one in which the concentration of the tungsten oxide powder in the slurry is 30% by mass. If the concentration of the tungsten oxide powder is different, adjustment is made by removing or adding the aqueous solvent. The sample is placed in a cell (container) having a depth of 1 mm. The height is adjusted so that the surface of the slurry placed in the cell would be the plane of reflection. The reason for setting the concentration of the tungsten oxide powder of the sample to 10% by mass to 40% by mass is to facilitate measurements. The reason for making the surface of the slurry placed in the cell the plane of reflection is to facilitate measurements, as well.

The half-value width is determined using the most intense peak detected at 29°±1°. For measurement of the half-value width, the smaller of the values of the base portions of the peak is used as a reference value. The position from the reference value to the peak top is defined as a peak height. The width of the peak at a position corresponding to half the peak height is defined as a half-value width. The most intense peak detected at 29°±1° indicates a peak having the largest peak intensity ratio detected among 28° to 30°. Therefore, presence of a large peak outside this range is tolerable.

The X-ray diffraction indicates crystallinity of the tungsten oxide powder. If crystallinity is good, a sharp peak having a small half-value width is obtained. The half-value width of the most intense peak detected at 290±1° in X-ray diffraction analysis (2θ) being 2° or less indicates that crystal defects are suppressed. With good crystallinity, aggregation is less likely to occur even when the slurry is left to stand for a long time. The crystal defect is a disorder of crystal arrangement. It indicates that the regularity of the atomic arrangement of the crystal structure is broken more than necessary. If crystal defects are formed, defects are formed at the lower end of the conduction band at the band gap, and the apparent band gap is narrowed. Thus, absorption occurs in the visible light region, and the transmittance decreases.

The lower limit of the half-value width is not particularly limited, but is preferably 0.1° or more. A half-value width of less than 0.1° means that the repetitiveness of the crystal is high. This indicates that there are many primary particles exceeding 20 nm. If the primary particle diameter increases, transmitting light is scattered, and thus the transmittance may decrease at all wavelengths. Furthermore, the stability within the slurry also decrease due to the large particle size. In addition, if the primary particle size is large, aggregated particles become even larger. If the aggregated particles are large, $D_{50}$ tends to be excessively high. Thus, it is preferable that the half-value width of the most intense peak detected at 29°±1° in X-ray diffraction analysis (2θ) be 0.1° to 2°.

With the particle size distribution and crystallinity as described above, a slurry capable of suppressing aggregation can be provided.

The particle size frequency graph of the tungsten oxide powder preferably has one peak in the range of $D_0$ to $D_{90}$. The particle size frequency graph may be simply referred to as a frequency graph. As the peak in the frequency graph, ascension→apex (peak top)→descension, in the frequency graph is regarded as one peak, and among them a peak having a convex peak top of 1% or more is counted as a peak. The number of peak included in the range of $D_0$ to $D_{90}$ of the frequency graph being one indicates that there is only one set of ascension→apex→descension. This indicates that the particle size distribution is formed centered on the particle diameter of the apex (peak top). For example, if a peak at small particle size and a peak at larger particle sizes are present, there is a possibility that particles of the larger particle diameters are substantially aggregated particles. Namely, not only $D_{50}$ and $D_{90}$ of the cumulative graph, but the shape of the frequency graph is also indicated as being important.

The content of the tungsten oxide powder in the slurry is preferably in the range of 5% by mass to 50% by mass. If the amount of tungsten oxide powder is less than 5% by mass, the content is too small, and the efficiency of the coating process may decrease. If the amount of tungsten oxide powder is more than 50% by mass, the fluidity of the slurry may decrease. Decrease in fluidity makes aggregated particles more easily formed. Therefore, the content of the tungsten oxide powder in the slurry is preferably in the range of 5% by mass to 50% by mass, and more preferably in the range of 10% by mass to 40% by mass.

In addition, the content of the tungsten oxide powder in the slurry can be adjusted through the addition amount at the time of mixing with the aqueous solvent.

The method of determining the content of the tungsten oxide powder in the tungsten oxide powder slurry is as follows. First, the mass of a glass container is measured. The mass of the glass container is taken to be mass A. Next, 4 g to 5 g of the slurry is put into the glass container. The mass of the glass container containing the slurry is measured. The mass of the glass container containing the slurry is taken to be mass B. For mass B, a precision balance scale capable of performing measurement with 0.1 mg accuracy is used. Next, the glass container containing the slurry is placed on a hot plate heated to 120° C. Drying is carried out until the liquid of the slurry completely evaporates. The glass container after drying is cooled to room temperature. Thereafter, the mass of the glass container after drying is measured. The mass of the glass container after drying is taken to be mass C. The mass (%) of the tungsten oxide powder in the slurry is determined by [(mass C−mass A)/(mass B−mass A)]×100%.

The aqueous solvent may contain alcohol. The aqueous solvent is a liquid containing water as a main component. Here, "containing water as a main component" means that the solvent contains water in an amount of 50% by mass or more. Alcohol may be contained within a range of 50 parts by mass or less based on 100 parts by mass of water.

The tungsten oxide powder slurry preferably contains one or more selected from ammonia, potassium hydroxide or sodium hydroxide. Ammonia ($NH_3$), potassium hydroxide (KOH), and sodium hydroxide (NaOH) have the effect of adjusting a pH of the slurry. They are water-soluble and suitable for pH adjustment. The pH is preferably 2 or more, and more preferably 4 or more. By adjusting the pH, the surface electrical potential of the tungsten oxide powder can be increased. As the surface electrical potential increases, the repulsive force between the powders increases. As the repulsive force increases, aggregated particles become difficult to form. The upper limit of the pH is not particularly limited, but is preferably pH 8 or less. When the pH is higher than 8, the alkalinity is too strong, which may adversely affect the coating process.

In addition, if the pH of the tungsten oxide powder slurry exceeds 8, the tungsten oxide powder may be dissolved. Dissolution of the tungsten oxide powder may adversely affect the particle diameters or crystallinity.

Furthermore, the average particle size of the tungsten oxide powder without the aqueous solvent is preferably 20 nm or less. The average particle size without the aqueous solvent being 20 nm or less means that there are few aggregated particles. The lower limit of the average particle size without the aqueous solvent is not particularly limited, but is preferably 5 nm or more. If the average particle size is less than 5 nm, the repetitiveness of the crystal structure decreases due to the particles being small. If the repetitiveness of the crystal structure decreases, good electrochromic properties may not be exhibited. If larger than 20 nm, light scattering increases, which may lower the transmittance. Furthermore, in concern of an electrochromic material, if the particle size is large, the influence of the ion diffusion rate within the particles increases, and therefore the color switching rate may decrease.

The particle size within the tungsten oxide powder slurry appears different from the particle size with the aqueous solvent removed. This is because the grain boundaries of the primary particles of the tungsten oxide powder are clearly apparent when the aqueous solvent is removed.

The method of measuring the average particle size of the tungsten oxide powder without the aqueous solvent is as follows. The slurry is placed in a glass container. The glass container containing the slurry is placed on a hot plate heated to 120° C. The aqueous solvent is completely removed. The sample remaining in the glass container is taken out and observed with a TEM (scanning transmission electron microscope). With the TEM, measurement is performed at a magnification of 1,000,000. The longest diagonal for the tungsten oxide powder shown in the TEM photograph is defined as a particle size. Since the tungsten oxide powder particles overlapping each other are aggregated particles, the outline of one powder particle is counted for overlapping portions. This operation is performed for twenty particles, and the average value thereof is defined as an average particle size.

A tungsten oxide powder containing 0.01 mol % to 50 mol % of one or more of potassium (K), sodium (Na), lithium (Li) or magnesium (Mg) may be included. By containing these elements in the tungsten oxide powder, the electrical conductivity of the tungsten oxide powder can be increased. Furthermore, these elements can be contained without deteriorating the crystallinity. For example, in a field in which electricity is applied such as an electrochromic device, a color switching reaction can be made quicker by increasing the electrical conductivity. If the content is less than 0.01 mol %, the effect of containing them is insufficient. If the content exceeds 50 mol %, the benefits of tungsten oxide cannot be taken advantage of. Therefore, the content is preferably 0.01 mol % to 50 mol %, and more preferably 1 mol % to 20 mol %. In the case of using a tungsten oxide powder containing potassium or the like, having at least a part of the tungsten oxide powder in the slurry contain potassium or the like would be sufficient. All the tungsten oxide powder in the slurry may contain potassium or the like.

The content of potassium or the like does not include KOH or the like added for pH adjustment of the slurry described above. The content of potassium or the like in the tungsten oxide powder refers to a content when potassium or the like is contained within the tungsten oxide powder particles. The content of potassium or the like may be, for example, 0.01% by mass to 50% by mass.

The slurry preferably has an absorbance of 1 or less at a wavelength of 600 nm. Furthermore, absorbance at wavelength 350 nm/absorbance at wavelength 600 nm is preferably 3 or more.

The absorbance is measured by the following method. First, a quartz cell having an optical path length of 1 cm is prepared. As a sample, A slurry with a concentration of the tungsten oxide powder of 0.01% by mass is prepared. As reference, a sample of pure water alone is prepared. The sample and reference are set in an absorbance measurement device. The wavelengths of from 300 nm to 800 nm are measured at a step size of 1 nm.

As an absorptiometer, UV-2700i manufactured by Shimadzu Corporation or an equivalent thereof is used.

The absorbance of the slurry at a wavelength of 600 nm being 1 or less indicates that the transmittance of visible light is good. Good transmittance of visible light indicates that the transparency is high. For example, the electrochromic device may be applied to a window glass. The photocatalyst may be applied to a wall. With high transparency, flaws such as a change in appearance can be reduced. Therefore, the slurry can be said to be convenient for use.

In addition, the absorbance at wavelength 350 nm/absorbance at wavelength 600 nm for the slurry being 3 or more indicates that ultraviolet light hardly passes through but visible light easily passes through. For example, in case of application to a window glass, a coating film through which ultraviolet light hardly passes but visible light easily passes can be formed.

The upper limit of the ratio absorbance at wavelength 350 nm/absorbance at wavelength 600 nm is not particularly limited, but is preferably 25 or less.

If the absorbance at wavelength 350 nm/absorbance at wavelength 600 nm is less than 3, there is a possibility that the particles are large, whereby light is scattered and the transmittance is diminished at all wavelengths. Alternatively, there is a possibility that the particles are excessively disintegrated and defects are introduced into the crystal structure. If the absorbance at wavelength 350 nm/absorbance at wavelength 600 nm exceeds 25, the particles are smaller than 5 nm, and the color switching rate as the electrochromic material may be lowered. Therefore, the ratio absorbance at wavelength 350 nm/absorbance at wavelength 600 nm is preferably 3 to 25, and more preferably 3 to 15.

The tungsten oxide powder slurry as described above can suppress generation of aggregated particles. Furthermore, even if the slurry is allowed to stand for a long time, generation of aggregated particles can be suppressed. A tungsten oxide powder slurry is a mixture of a tungsten oxide powder and an aqueous solvent. If the slurry is allowed to stand for a long time, the tungsten oxide powder in the slurry settles. This had resulted in generation of aggregated particles of the tungsten oxide powder. With the tungsten oxide powder slurry according to the embodiment, generation of aggregated particles can be suppressed even if left to stand for 24 hours or more.

Such a tungsten oxide powder slurry can be applied to various fields such as an electrochromic material, a battery electrode material, a photocatalyst material, and a sensor material.

The electrochromic device is a device in which a reversible change occurs in photophysical properties upon application of electric charge. Thereby, the transparent state and the colored state can be switched.

The photocatalyst decomposes harmful substances (for example, acetaldehyde) in gas (for example, air) through contact between the photocatalyst material and the gas.

The battery electrode material is used for an electrode material of a Li-ion secondary battery or a capacitor.

Examples of the sensor include a gas sensor. For example, a sensor provided with the tungsten oxide powder is placed in an atmosphere containing methane gas ($CH_4$). The electric resistance value changes according to the amount of methane gas adsorbed onto the tungsten oxide powder. By utilizing this performance, a methane gas sensor can be obtained.

For application to each use, a coating film is formed. The coating film is formed by using a paste. The paste is a mixture where an organic substance is mixed into the tungsten oxide powder slurry. Examples of the organic substance include a binder. Because the organic substance is mixed-in, the paste has higher viscosity than the slurry. Since generation of aggregated particles is suppressed in the tungsten oxide powder slurry according to the embodiment, generation of aggregated particles can also be suppressed in the paste using the same. In addition, generation of aggregated particles can be suppressed even if the tungsten oxide powder slurry is allowed to stand for 24 hours or more, and thus the usability is good.

The tungsten oxide powder slurry is preferably used for producing an electrochromic device. As described above, the tungsten oxide powder slurry is excellent in transmittance of visible light. Therefore, it is possible to obtain a coating film having excellent transmittance of visible light. In electrochromic devices, the transparent and colored states can be switched by turning on and off electric charges. Electrochromic devices are used for displays or light-modulating systems. Examples of the light-modulating systems include light-modulating glass, light-modulating eyeglasses, and antidazzle mirror. The light-modulating systems are used in various fields such as vehicles, aircrafts, and buildings. For example, if used for a window glass of a building as a light-modulating glass, entry of sunlight can be switched between ON and OFF. In addition, transmission of ultraviolet light can be suppressed. In other words, it can be said as being suitable for an electrochromic device for controlling ON and OFF entry of sunlight.

Figure 4:
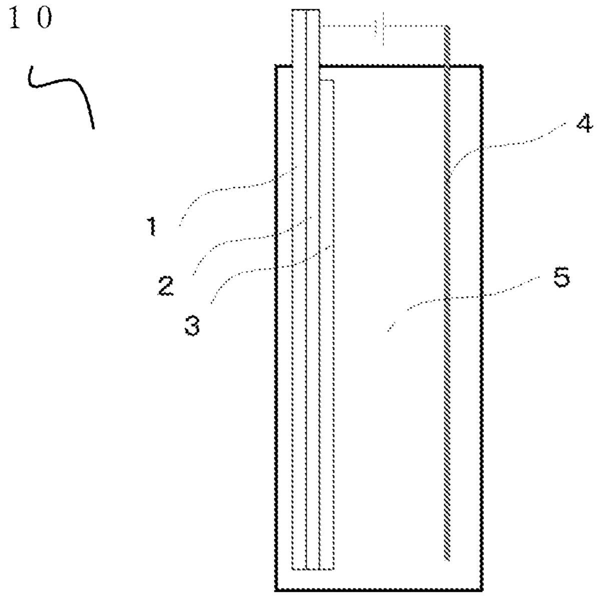
FIG. 4 is a diagram showing an example of an electrochromic device.

FIG. 4 shows an example of the electrochromic device. In the figure, 1 denotes a glass substrate, 2 denotes a transparent electrode, 3 denotes an electrochromic layer, 4 denotes a counter electrode, 5 denotes an electrolyte, and 10 denotes a cell. FIG. 4 is a schematic view of a cell structure of an electrochromic device. The glass substrate 1 has good light transmittance. If light transmission is not desired, a glass substrate need not be used. The transparent electrode 2 may be made of a material such as ITO.

The electrochromic layer 3 uses the tungsten oxide powder slurry according to the embodiment. The tungsten oxide powder paste is applied onto the transparent electrode 2 and dried to form the electrochromic layer 3. The drying process is preferably performed in the range of 120° C. to 270° C.

The counter electrode 4 is platinum or the like. The counter electrode 4 is provided on a glass substrate, which is not shown. The electrolyte 5 is filled between the electrochromic layer 3 and the counter electrode 4. The surrounding of the electrolyte 5 is sealed. Upon application of voltage to the transparent electrode 2 and the counter electrode 4, the electrochromic layer 3 becomes transparent.

Next, a method of producing the tungsten oxide powder slurry according to the embodiment will be described. The method of producing the tungsten oxide powder slurry according to the embodiment is not limited as long as the slurry has the above-described features; the following is an example of a method of producing the tungsten oxide powder slurry with a high yield.

First, a tungsten oxide powder is prepared. The tungsten oxide powder preferably has an average particle size of 10 μm or less, and more preferably 50 nm or less. Examples of a method of producing the tungsten oxide powder include a method using a sublimation process or a liquid phase synthesis process. The sublimation process is preferably any one of plasma treatment, arc treatment, laser treatment or electron beam treatment. Among these, plasma treatment is preferable. The plasma treatment is exemplified in PCT publication WO 2018/199020 A1 and Japanese Patent No. 5641926. The liquid phase synthesis process is a method of production by dissolving a precursor of a metal compound in a solution and changing the pH or temperature of the solution to precipitate the metal compound. The liquid phase synthesis process is exemplified in PCT publication WO 2020/196720 A1.

When one or more of potassium, sodium, lithium or magnesium are contained, they are preferably added when performing the sublimation process or the liquid phase synthesis process.

Next, a grinding process of grinding the tungsten oxide powder is performed. The grinding process is preferably bead milling. The tungsten oxide powder tends to aggregate. Therefore, it is necessary to resolve the aggregated particles (secondary particles) into primary particles through a grinding process.

A bead mill is a media pulverizer that uses media referred to as beads. The beads preferably have a particle size of 0.05 mm to 0.5 mm. The beads preferably contain zirconium oxide as a main component.

An example of the grinding process includes ball milling. The ball milling is a method using media having a diameter of 2 mm or more. Media having a diameter of 2 mm or more cannot accomplish sufficient grinding. Furthermore, a grinding process using a homogenizer cannot accomplish sufficient grinding, either. The homogenizer is a grinding device in which a fixed blade and a rotary blade are combined. Since the method does not use media, sufficient grinding cannot be performed. Therefore, the bead mill is preferable.

If the beads have a particle size of less than 0.05 mm or a large particle size exceeding 0.5 mm, the grinding efficiency may be lowered. Therefore, the particle size of the beads is preferably 0.05 mm to 0.5 mm, and more preferably 0.1 mm to 0.3 mm.

The beads preferably contain zirconium oxide as a main component. Examples of the beads include zirconium oxide, aluminum oxide, and soda lime glass. The zirconium oxide beads are less aggressive to the tungsten oxide powder. That is, the grinding can be efficiently performed, with the damage to the tungsten oxide powder being little. Therefore, the tungsten oxide powder is less likely to have crystal defects generated.

Through suppression of generation of crystal defects, the half-value width of the most intense peak detected at 29°±1° in X-ray diffraction analysis (2θ) can be made 2° or less. The zirconium oxide beads are ceramic sintered bodies containing zirconium oxide as a main component, and may contain a sintering aid.

Here, "containing zirconium oxide as a main component" means that one bead contains 50% by mass or more of zirconium oxide. The content of zirconium oxide is preferably 90% by mass or more.

Next, a process of adding the tungsten oxide powder subjected to the grinding process to an aqueous solvent is performed. The aqueous dispersion liquid is a liquid containing water as a main component. Water is preferably pure water. If the amount of impurities is large as in tap water, the aggregation property may be affected. Pure water satisfies A1 noted in JIS-K-0557 (1998). The aqueous solvent may contain alcohol. Alcohol may be contained in an amount of 50 parts by mass or less based on 100 parts by mass of water.

The content of the tungsten oxide powder in the slurry is preferably in the range of 5% by mass to 50% by mass.

If necessary, the tungsten oxide powder slurry preferably contains one or more selected from ammonia, potassium hydroxide or sodium hydroxide. These are water-soluble and suitable for pH adjustment. The pH is preferably 2 or more, and more preferably 4 or more. By adjusting the pH, the surface electrical potential of the tungsten oxide powder can be increased. As the surface electrical potential increases, the repulsive force between the powders increases. With the repulsive force increased, aggregated particles are hardly formed. The upper limit of the pH is not particularly limited, but the pH of 8 or less is preferable.

On one hand, ammonia and the like are effective components for pH adjustment. On the other hand, ammonia is a component that is difficult to handle. In consideration of ease of handling, addition of ammonia or the like is preferably omitted, if not necessary.

After water and tungsten oxide are mixed, stirring using a stirrer or ultrasonic waves is preferably performed.

Furthermore, in bead milling, the filling rate of beads in the dispersing chamber is preferably within the range of 40% by volume to 90% by volume. The filling rate of beads is a feeding amount of beads when the volume inside the dispersing chamber is taken as 100% by volume. If the filling rate of beads is in the range of 40% by volume to 90% by volume, contact between the beads and the tungsten oxide powder can be made uniform. Therefore, the filling rate of beads is preferably 40% by volume to 90% by volume, and more preferably 60% by volume to 80% by volume.

The total amount of water and the tungsten oxide powder fed into the dispersing chamber of the bead mill is preferably within the range of 10% by volume to 60% by volume, taking the volume inside the dispersing chamber as being 100% by volume. In the bead mill, a dispersing chamber fed with beads is rotated, or beads are rotated with stirring blades provided inside the dispersing chamber. If the total feeding amount of the beads and the tungsten oxide powder is too large, the impact force associated with the rotation may be lowered. If the total feeding amount of the beads and the tungsten oxide powder is too small, the production efficiency is lowered. Therefore, the feeding amount into the dispersing chamber is preferably 10% by volume to 60% by volume, and more preferably 20% by volume to 40% by volume. If ammonia or the like is added, the feeding amount is calculated by including the ammonia in water.

The impact through the bead mill is preferably in the range of 100 G to 500 G. In order to achieve such an impact, it is preferable to set the rotation speed of the dispersing chamber to 7 m/sec or more. The grinding time is preferably 20 minutes or more.

Through the above process, a tungsten oxide powder slurry can be produced. Thereafter, the slurry can be put into a container and stored. A container that is not easily altered due to the tungsten oxide powder slurry is selected. Such a container is preferably a glass container or polymeric container.

The tungsten oxide powder slurry according to the embodiment can suppress formation of aggregated particles. Therefore, even if stored in a static state, formation of aggregated particles can be suppressed.

EXAMPLE

Examples 1 to 6 and Comparative Examples 1 to 6

Tungsten oxide powders were prepared through plasma treatment. In Examples 1 to 3, a tungsten oxide powder was prepared. In Example 4, a tungsten oxide powder to which 5 mol % of potassium was added was prepared. In Example 5, a tungsten oxide powder to which 4 mol % of sodium was added was prepared. In Example 6, a tungsten oxide powder to which 2 mol % of lithium was added was prepared. The average particle sizes before forming the slurry were as shown in Table 1.

Pure water was prepared as an aqueous dispersion liquid. The pure water satisfied A1 noted in JIS-K-0557 (1998). Furthermore, ammonia was prepared as a pH adjuster.

The tungsten oxide powder and water were mixed. As necessary, ammonia was added to adjust the pH. Through this process, tungsten oxide powder slurries were obtained.

Next, the tungsten oxide powder slurries were subjected to a grinding process. The grinding process was performed under the conditions shown in Table 1. The media refers to beads in bead milling and balls in ball milling. The feeding amount of media into the dispersing chamber refers to total volume % of the fed media when the volume inside the dispersing chamber is taken as 100% by volume. The feeding amount of slurry into the dispersing chamber refers to volume % of the fed tungsten oxide powder slurry when the volume inside the dispersing chamber is taken as 100% by volume. The rotation speed of the dispersing chamber of the bead mill was set to 7 m/sec or higher.

In Comparative Example 1, ball milling was used. In Comparative Example 2, the particle size of the beads was set smaller. In Comparative Example 3, $Al_2O_3$ beads were used. In Comparative Example 4, the feeding amount of beads was reduced. In Comparative Example 5, a homogenizer was used. In Comparative Example 6, the grinding process was not performed.

TABLE 1

| | Average Particle Size of Tungsten Oxide Powder (nm) | Grinding Process | | | | | |
|---|---|---|---|---|---|---|---|
| | | Method | Media Diameter (mm) | Media Material | Milling Time (h) | Feeding Amount of Media into Dispersing Chamber (volume %) | Feeding Amount of Slurry into Dispersing Chamber (volume %) |
| Example 1 | 5 | Bead Milling | 0.1 | $ZrO_2$ | 2 | 80 | 60 |
| Example 2 | 30 | Bead Milling | 0.5 | $ZrO_2$ | 5 | 50 | 50 |
| Example 3 | 10 | Bead Milling | 0.05 | $ZrO_2$ | 0.5 | 40 | 40 |
| Example 4 | 10 | Bead Milling | 0.2 | $ZrO_2$ | 3 | 60 | 30 |
| Example 5 | 11 | Bead Milling | 0.1 | $ZrO_2$ | 4 | 55 | 40 |
| Example 6 | 8 | Bead Milling | 0.1 | $ZrO_2$ | 2 | 80 | 18 |
| Comparative Example 1 | 5 | Ball Milling | 2 | $ZrO_2$ | 4 | 35 | 30 |
| Comparative Example 2 | 5 | Bead Milling | 0.01 | $ZrO_2$ | 10 | 50 | 50 |
| Comparative Example 3 | 30 | Bead Milling | 0.1 | $Al_2O_3$ | 2 | 50 | 50 |
| Comparative Example 4 | 5 | Bead Milling | 0.1 | $ZrO_2$ | 5 | 20 | 55 |
| Comparative Example 5 | 5 | Homogenizer | — | — | 0.5 | — | — |
| Comparative Example 6 | 5 | none | — | — | — | — | — |

Through the above-described process, tungsten oxide powder slurries subjected to the grinding process were produced. In Examples 1 and 3 and Comparative Examples 1, 2 and 4, ammonia was added to adjust the pH.

The tungsten oxide powder slurries were stored in polymer containers. They were left to stand for the times shown in Table 2. Thereafter, the particle size distribution, X-ray diffraction, and absorbance were measured. For the methods of measuring the particle size distribution, X-ray diffraction, and absorbance, the above-described methods were adopted. The results are shown in Table 3.

TABLE 2

| | Tungsten Oxide Powder Slurry | | | |
|---|---|---|---|---|
| | Content of Tungsten Oxide Powder (mass %) | Particle Size (nm) | pH | Standing Time |
| Example 1 | 30 | 10 | 6.5 | 7 days |
| Example 2 | 35 | 12 | 2 | 1 day |
| Example 3 | 20 | 20 | 5 | 10 days |
| Example 4 | 28 | 12 | 6.5 | 7 days |
| Example 5 | 25 | 11 | 3 | 5 days |
| Example 6 | 20 | 8 | 5 | 7 days |
| Comparative Example 1 | 30 | 10 | 6.5 | 4 days |
| Comparative Example 2 | 30 | 25 | 2 | 1 hour |
| Comparative Example 3 | 30 | 50 | 2 | 1 hour |
| Comparative Example 4 | 25 | 4 | 7.5 | 7 days |
| Comparative Example 5 | 30 | 10 | 5 | 1 hour |
| Comparative Example 6 | 30 | 10 | 2 | 1 hour |

TABLE 3

| | Particle Size Distribution | | X-ray diffraction Half-value Width of Strongest Peak at 29° ± 1° (°) | Absorbance | |
|---|---|---|---|---|---|
| | $D_{50}$ (nm) | $D_{90}$ (nm) | | Absorbance at wavelength 600 nm | Absorbance Ratio of Wavelength 350 nm/ Wavelength 600 nm |
| Example 1 | 20 | 100 | 1.3 | 0.03 | 9 |
| Example 2 | 8000 | 70000 | 1.0 | 0.6 | 3 |
| Example 3 | 30 | 90 | 1.6 | 0.08 | 5 |
| Example 4 | 25 | 75 | 1.4 | 0.02 | 14 |
| Example 5 | 55 | 120 | 1.2 | 0.06 | 10 |
| Example 6 | 20 | 65 | 1.6 | 0.02 | 15 |
| Comparative Example 1 | 200 | 800 | 2.1 | 1.2 | 4 |
| Comparative Example 2 | 10 | 60 | 3.5 | 0.8 | 1.8 |
| Comparative Example 3 | 100000 | 300000 | 0.05 | 1.5 | 1.8 |
| Comparative Example 4 | 30 | 50 | 4 | 0.01 | 27 |
| Comparative Example 5 | 1000 | 4000 | 2.3 | 1.3 | 1.4 |
| Comparative Example 6 | 120000 | 350000 | 1.0 | 1.5 | 1.2 |

$D_{50}$ and $D_{90}$ shown in Table 3 are valued obtained by the dynamic light scattering method using the slurry as a sample. The particle diameter in Table 2 is a value obtained through TEM observation of the tungsten oxide powder obtained by removing water from the slurry. The content of the tungsten oxide powder in Table 2 is a value obtained by measuring the mass of the tungsten oxide powder remaining after removal of water from the slurry.

As can be seen from the table, it was found that for the tungsten oxide powder slurries according to the Examples, aggregated particles were not formed even when left to stand for 24 hours (1 day) or more. In addition, the number of peak present within the range of from $D_0$ to $D_{90}$ in the particle size frequency graph was one. The absorbance at a wavelength of 600 nm was 1 or less. Furthermore, the ratio of, absorbance at a wavelength of 350 nm/absorbance at a wavelength of 600 nm, was 3 or more. It was found that ultraviolet rays are blocked but visible light is transmitted.

In contrast, in Comparative Example 1, the half-value width exceeded 2°. In Comparative Examples 2 and 4, the crystallinity was poor, and the absorbance therefore decreased. In Comparative Examples 1, 3, 5 and 6, many aggregated particles were generated, and the absorbance therefore decreased.

Next, an electrochromic device was produced using the tungsten oxide powder slurry according to the Examples and Comparative Examples. A binder was added to each slurry to form a paste. Using the paste, a coating process was performed to form an electrochromic layer.

For the electrochromic device for transmittance measurement, the structure shown in FIG. 4 was adopted. A transparent electrode 2 was provided on a glass substrate 1 having a width of 8 mm. The transparent electrode 2 was made of ITO. A tungsten oxide powder paste was applied on the transparent electrode 2. Through drying at about 200° C., an electrochromic layer 3 was obtained. This was placed in a glass silica cell having an optical path length of 1 cm. The cell was filled with an electrolyte. As counter electrode 4, platinum was used. The counter electrode 4 was placed in the cell. The counter electrode 4 was arranged so as not to overlap the light for transmittance measurement.

The measurement was performed by applying voltage between the transparent electrode 2 and the counter electrode 4. When transparent, a positive voltage was applied to the electrode, and proceeded while observing color change until the transmittance stopped changing. When the transmittance stopped changing, the application of the voltage was stopped, and the measurement was performed within 5 minutes. The transmittance at a wavelength of 600 nm when the electrochromic device was transparent was measured.

The results are shown in Table 4.

TABLE 4

| | Transmittance at wavelength 600 nm (%) |
|---|---|
| Example 1 | 90 |
| Example 2 | 80 |
| Example 3 | 85 |
| Example 4 | 87 |
| Example 5 | 82 |
| Example 6 | 90 |
| Comparative Example 1 | 60 |
| Comparative Example 2 | 30 |
| Comparative Example 3 | 30 |
| Comparative Example 4 | 95 |
| Comparative Example 5 | 55 |
| Comparative Example 6 | 40 |

As can be seen from the table, the electrochromic device using the slurry according to the Examples has a high transmittance at a wavelength of 600 nm. Therefore, it can be seen that the device becomes highly transparent after applying a positive voltage. In contrast, for Comparative Examples 1-3 and 5-6, the transmittance decreased.

Figure 3:
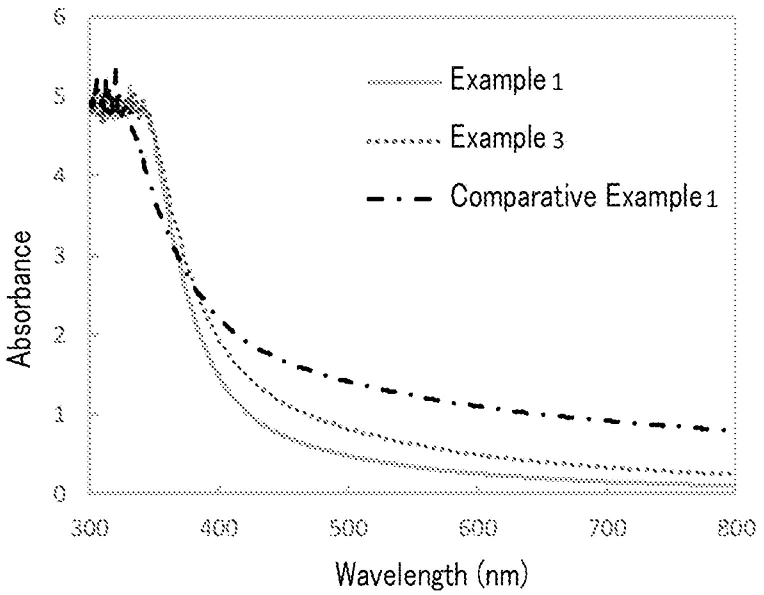
FIG. 3 shows an example of an absorbance of the tungsten oxide powder slurry according to the embodiment.

FIG. 3 shows the results of measurement of the absorbance of Example 1, Example 3 and Comparative Example 1. In the figure, the vertical axis represents the absorbance, and the horizontal axis represents the wavelength. As can be seen from the figure, Example 1 and Example 3 have low absorbance in the visible light region (400 nm to 800 nm). In other words, the transparency of visible light other than the wavelength of 600 nm is also good.

In addition, in Comparative Example 4, the transmittance was good because the particle size was small. However, due to the poor crystallinity of the tungsten oxide, the color switching rate was slow. The electrochromic device according to the Examples had a faster color switching rate than any of the Comparative Examples. Therefore, it can be seen that the tungsten oxide powder slurry according to the Examples can achieve both the transmittance and the color switching rate.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention. In addition, each of the above-mentioned embodiments can be carried out in combination with one another.

REFERENCE SIGNS LIST

1. Glass substrate
2. Transparent electrode
3. Electrochromic layer
4. Counter electrode
5. Electrolyte
10. Cell

What is claimed is:

1. A tungsten oxide powder slurry comprising:
a tungsten oxide powder; and
an aqueous solvent,
wherein $D_{50}$ is 20 nm to 10000 nm and $D_{90}$ is 100000 nm or less in a particle size cumulative graph of the tungsten oxide powder in the slurry,
a half-value width of a most intense peak detected at 29°±1° is 2° or less according to X-ray diffraction, and
an absorbance at a wavelength of 600 nm is 1 or less.

2. The tungsten oxide powder slurry according to claim 1, wherein $D_{50}$ is 500 nm or less, and $D_{90}$ is 1000 nm or less.

3. The tungsten oxide powder slurry according to claim 2, wherein a particle size frequency graph of the tungsten oxide powder has one peak within a range of $D_0$ to $D_{90}$.

4. The tungsten oxide powder slurry according to claim 1, wherein a particle size frequency graph of the tungsten oxide powder has one peak within a range of $D_0$ to $D_{90}$.

5. The tungsten oxide powder slurry according to claim 4, wherein a content of the tungsten oxide powder in the slurry is within a range of 5% by mass to 50% by mass.

6. The tungsten oxide powder slurry according to claim 4, comprising one or more selected from a group consisting of ammonia, potassium hydroxide, and sodium hydroxide.

7. The tungsten oxide powder slurry according to claim 4, wherein the tungsten oxide powder without the aqueous solvent has an average particle size of 20 nm or less.

8. The tungsten oxide powder slurry according to claim 1, wherein a content of the tungsten oxide powder in the slurry is within a range of 5% by mass to 50% by mass.

9. The tungsten oxide powder slurry according to claim 1, comprising one or more selected from a group consisting of ammonia, potassium hydroxide, and sodium hydroxide.

10. The tungsten oxide powder slurry according to claim 1, wherein the tungsten oxide powder without the aqueous solvent has an average particle size of 20 nm or less.

11. The tungsten oxide powder slurry according to claim 1, comprising a tungsten oxide powder comprising 0.01% by mass to 50% by mass of one or more of potassium, sodium, lithium, or magnesium.

12. The tungsten oxide powder slurry according to claim 1, wherein a ratio, absorbance at wavelength 350 nm/absorbance at wavelength 600 nm, is 3 or more.

13. A slurry for producing an electrochromic device, the slurry comprising the tungsten oxide powder slurry according to claim 1.

14. A method of producing an electrochromic device, wherein the tungsten oxide powder slurry according to claim 1 is used to produce the electrochromic device.

15. A method of producing the tungsten oxide powder slurry according to claim 1, the method comprising:
grinding the tungsten oxide powder with a bead mill using beads having a particle size of 0.05 mm to 0.5 mm; and
mixing the ground tungsten oxide powder with the aqueous solvent.

16. The method of producing the tungsten oxide powder slurry according to claim 15, wherein each of the beads contains 50% by mass or more of zirconium oxide.

* * * * *